UNITED STATES PATENT OFFICE.

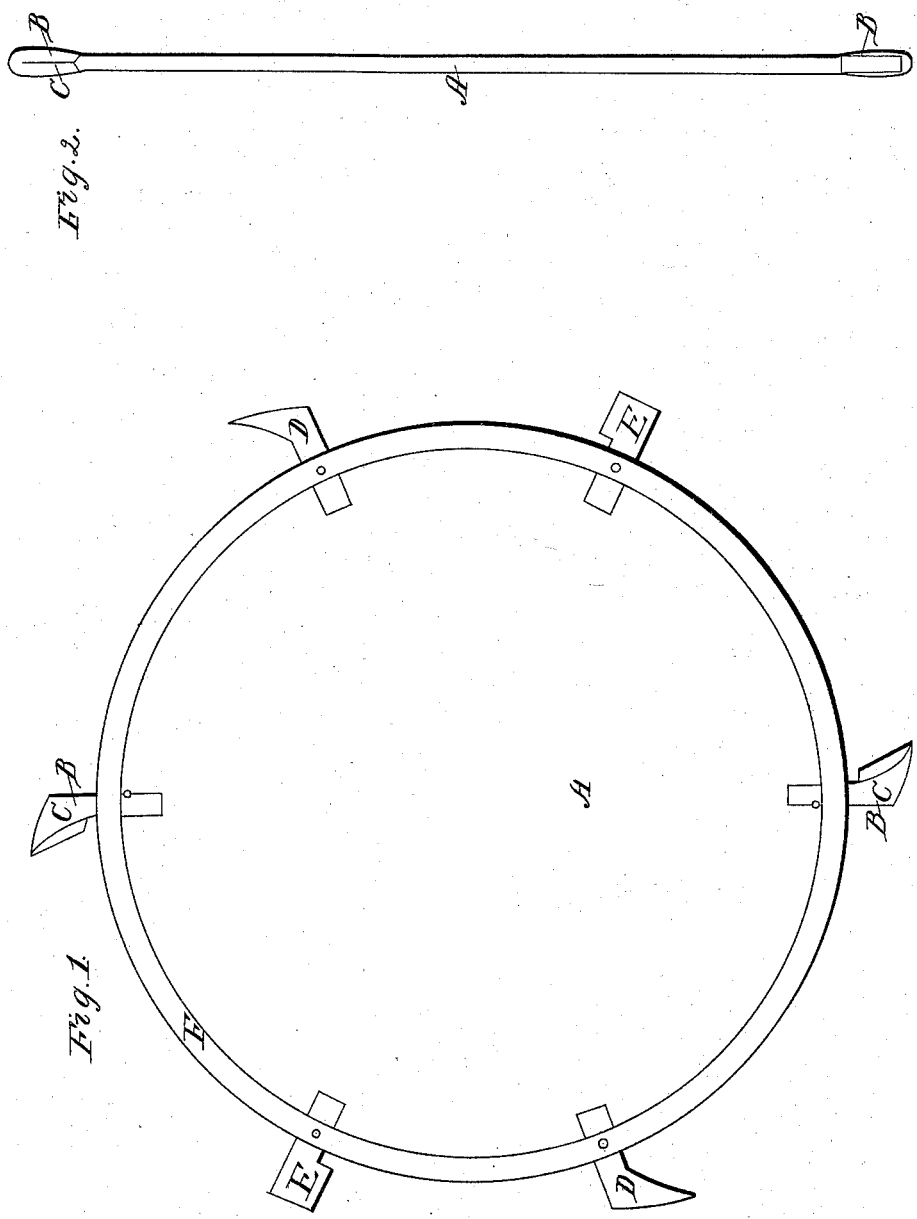

GEO. F. WOOLSTON, OF ORANGEBURG, SOUTH CAROLINA.

TEETH OF SAWS.

Specification of Letters Patent No. 7,979, dated March 11, 1851.

*To all whom it may concern:*

Be it known that I, GEORGE F. WOOLSTON, of the district of Orangeburg and State of South Carolina, have invented a new Improvement in Teeth for Circular Saws, Which is for the Purpose of Planing Lumber in the Operation of Sawing or of Making it Smoother, so that it may be the More Easily Planed; and I do hereby declare that the following is a full and exact description of the same, reference being had to the annexed drawings, making a part of this specification, in which—

Figure 1 is a perspective view, Fig. 2 an edge view, like letters referring to like parts.

A represents a circular saw blade, B B teeth. The under part of the teeth contain a groove, so as to form a chisel, having a sharp edge at front and sides, the form of which as seen in Fig. 2. The line C represents the groove. This tooth has to be inserted in the saw blade.

D D and E E Fig. 1, represent an application of the same principle in another form.

D D are teeth having a sharp edge in front.

E E are teeth containing a groove, and having a sharp edge at the sides, the groove being open at each end.

F is a band encircling the blade, of the same thickness as the cutting part of the teeth, through which the teeth are inserted, and made fast by the rivet in the center. The purpose of the band is to hold the teeth more firmly in their place, and prevent vibration.

I claim as my invention—

The invention of teeth in circular saw blades, of the form, and for the purpose above set forth.

GEORGE F. WOOLSTON.

Witnesses:
JOHN LECKIE,
JAMES JONES.